OXYGEN LANCE ASSEMBLY
Original Filed April 3, 1967
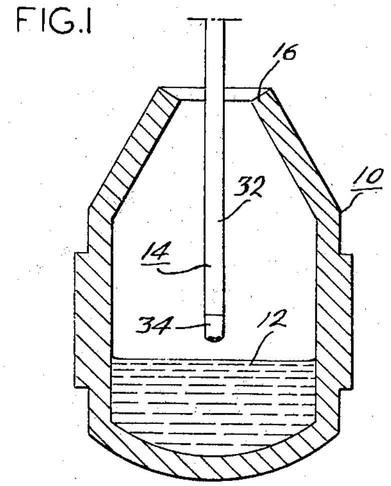
FIG. 1
FIG. 2. (PRIOR ART)
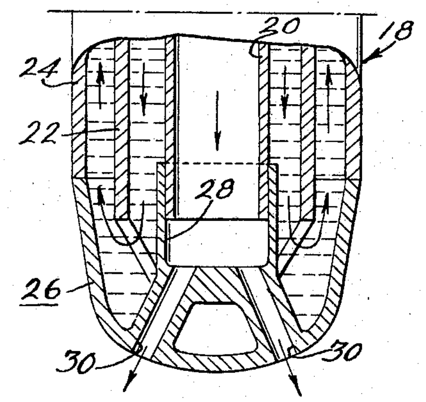
FIG. 3.
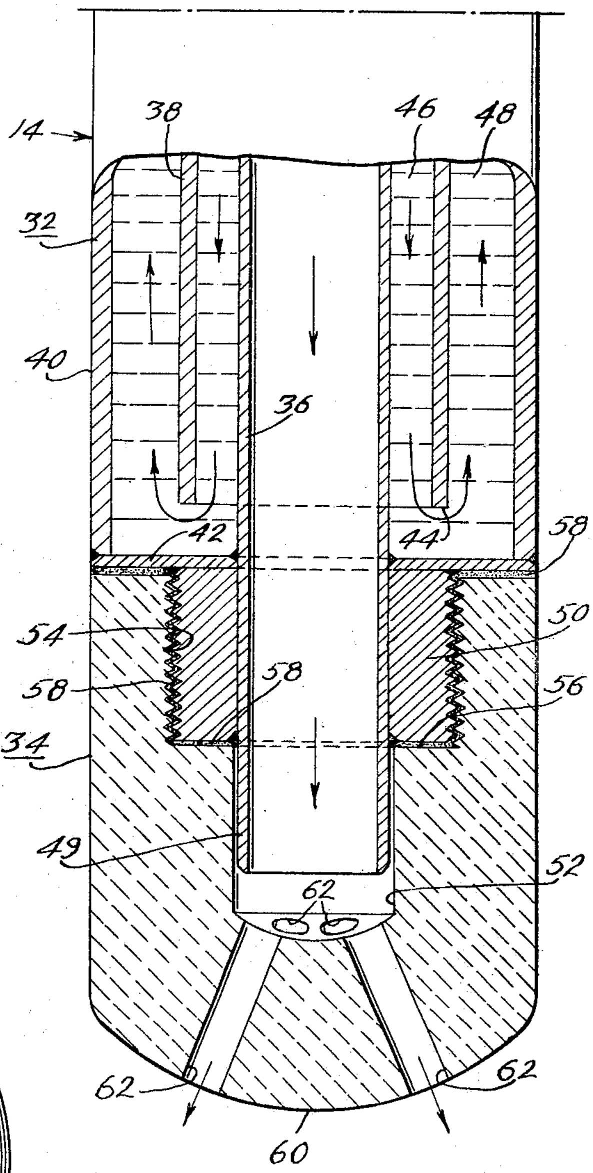
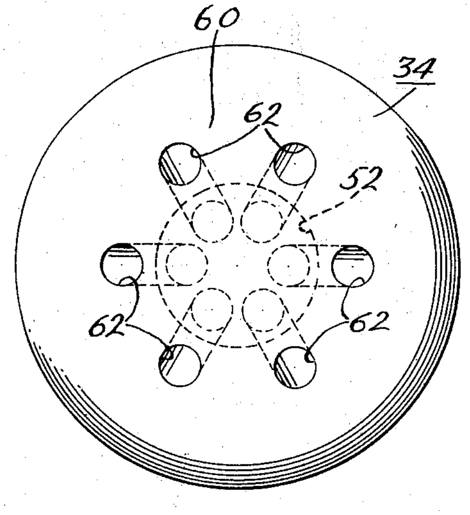
FIG. 4.
INVENTORS:
LOUIS HINKELDEY, JR.
MILTON H. KOENEMAN
JEROME A. SPIECKERMAN
BY
Howson & Howson
ATTYS.

United States Patent Office 3,504,856

Patented Apr. 7, 1970

3,504,856

OXYGEN LANCE ASSEMBLY

Louis Hinkeldey, Jr., 1103 Stokes Ave., Collingswood, N.J. 08108; Milton H. Koeneman, 21 Cobblestone Drive, Paoli, Pa. 19303; and Jerome A. Spieckerman, 2 Tendlar Lane, Malvern, Pa. 19355

Continuation of application Ser. No. 627,823, Apr. 3, 1967. This application May 15, 1969, Ser. No. 827,107

Int. Cl. B05b *1/00, 15/00*

U.S. Cl. 239—132.3 4 Claims

ABSTRACT OF THE DISCLOSURE

An oxygen lance assembly for use in steel refining furnaces comprising a water cooled metal lance having a replaceable nozzle of refractory material on the lower end thereof. The water cooling channels of the lance do not extend into the nozzle so that cooling may continue in the event of nozzle failure to prevent consumption of the lance.

This is a continuation of Ser. No. 627,823, filed Apr. 3, 1967, now abandoned.

The present invention relates generally to oxygen lances for use in steel refining processes and relates more particularly to a novel oxygen lance assembly which includes a replaceable nozzle of refractory material.

Oxygen lances are conventionally employed in basic oxygen furnaces and to some extent in open hearth and electric furnaces to obtain an accelerated refining action by blowing oxygen at high velocity onto the surface of the molten metal. In operation, the lance is vertically positioned in the furnace with the lower nozzle end closely spaced above the surface of the metal bath. Because of the downwardly directed oxygen blast, the lance, particularly at the nozzle end, is subjected to intense heat radiation as well as splashing slag.

In the conventional oxygen lance construction, the lance including the nozzle portion is cooled by a flow of water passing downwardly through an inner annular channel in the lance into the nozzle and upwardly along the outer walls of the lance. The lance is conventionally made of steel and the nozzle of steel, brass or copper to effect a rapid transfer of heat to the cooling water.

Despite the water cooling of the conventional lance and nozzle, after a relatively short period of exposure to the severe heat and slag splash conditions and high velocity oxygen flow, failure of the nozzle will occur permitting cooling water to leak through the nozzle onto the molten steel. The cooling water flow must thereupon be immediately halted, and the lower portion of the lance is consequently consumed by the furnace heat before it can be withdrawn. With the prior art lances, the failure of the lance nozzle thus meant the loss of the entire lance. The cost of nozzle failure involved not only the replacement expenses for the lance, but also substantial losses caused by the delay in the furnace operating cycle.

In the present invention, a metal water cooled lance is provided with a replaceable nozzle of refractory material which may, for example, be threadedly secured to the lower end of the lance and which requires no cooling water flow. As a result, should the nozzle be eroded or damaged during operation, the cooling flow to the lance need not be discontinued and the lance can be withdrawn intact whereupon a new nozzle may be quickly and inexpensively installed. The invention thus affords a substantial saving by eliminating the need for lance replacement following nozzle failure.

In view of the above, it is a primary object of the present invention to provide an oxygen lance assembly for steel refining furnaces which includes a replaceable nozzle of refractory material.

A further object of the invention is to provide a lance assembly as described, the refractory nozzle of which does not require water cooling, thus permitting the continued cooling of the lance upon damage to the nozzle to allow intact withdrawal of the lance from the furnace.

An additional object of the invention is to provide a lance assembly as described, the nozzle of which may be quickly and inexpensively replaced to minimize delay in furnace operation upon nozzle failure.

Another object of the invention is to provide an oxygen lance assembly as described of a simple and inexpensively fabricated construction.

Additional objects and advantages of the invention will be more readily apparent from the following detailed description of an embodiment thereof when taken together with the accompanying drawings in which:

FIG. 1 is a schematic sectional view of a basic oxygen furnace showing an oxygen lance assembly in accordance with the present invention in operating position above the molten steel bath;

FIG. 2 is a partial sectional view showing the lower end of a conventional oxygen lance;

FIG. 3 is an enlarged partial sectional view of the lower end of the lance assembly of FIG. 1; and FIG. 4 is a bottom end view of the lance assembly of FIG. 3.

Referring to the drawings, FIG. 1 schematically shows a basic oxygen furnace 10 containing a heat of molten steel 12 against the surface of which oxygen is blown in large quantities through the oxygen lance assembly 14. The lance assembly is lowered through the open end 16 of the furnace to the position illustrated closely spaced above the surface of the molten steel. The application of oxygen at high velocities to the molten steel bath greatly accelerates the refining process. While this is the primary technique used in the basic oxygen furnace, it is also employed in open hearth furnaces and in some electric furnace operations. The type of lance used is essentially the same in each case and it should be understood that the present lance assembly may be utilized in any type of steel making operation.

When the oxygen is directed against the surface of the steel, the lance is subjected to intense heat radiation and must be water cooled to prevent its destruction. There is, in addition, a certain amount of splashing of slag which is apt to contact the lower end of the lance and the water cooling also serves to minimize damage from this cause.

The conventional type of lance presently in use is illustrated in FIG. 2. The lance generally designated 18 comprises three concentric pipes, an inner pipe 20 through which the oxygen passes, an intermediate pipe 22 and an outer pipe 24. The nozzle 26 welded to the lower end of the lance includes a chamber 28 into which the oxygen passes from the pipe 20 and a plurality of angularly directed outlet ports 30 through which the oxygen is discharged in the desired pattern into the steel bath. The nozzle 26 is appropriately partitioned to permit a cooling flow of water to pass downwardly between the pipes 20 and 22 into the nozzle and thence upwardly between pipes 22 and 24 to carry off the transferred heat. With this conventional water cooled metal nozzle, a break in the nozzle wall will result in a leak which necessitates the immediate shut off of the cooling water with the consequent destruction of the lower part of the lance.

In the present invention, as illustrated in the embodimetn of FIGS. 3 and 4, the lance assembly 14 includes an elongated lance 32 and a nozzle 34 of refractory material which is demountably attached at the lower end thereof. The lance 32 except for its lower end, is of a conventional construction and comprises an inner oxygen carrying pipe 36, an intermediate pipe 38 and an outer pipe 40, the pipes being concentrically secured in a well known manner. An annular bottom plate 42 extends between the lower end of the outer pipe 40 and the inner pipe 36 with the lower end 44 of the intermediate pipe 38 terminating in spaced relation above the plate 42. This arrangement permits a flow of cooling water to pass downwardly through the annular channel 46 defined by the inner and intermediate pipes 36 and 38, between the lower end 44 of pipe 38 and plate 42, and upwardly through the channel 48 between the pipe 38 and the outer pipe 40.

A section 49 of the inner pipe 36 extends downwardly below the bottom plate 42 and is provided with a threaded metal collar 50 onto which the nozzle 34 is threadedly secured, a sufficient thread clearance being provided for expansion. The nozzle includes a central bore 52 of sufficient size to receive the extending section 49 of the pipe 36. The bore 52 is enlarged at 54 and threaded to cooperate with the threaded collar 50. A flat shoulder 56 of the nozzle at the lower end of the enlarged portion of the bore 54 is adapted to seat against the lower face of the collar 50. A suitable packing material 58 is inserted between the threaded and axially confronting surfaces of the nozzle and lance. This prevents the direct seating of the ceramic nozzle against the metallic lance and collar and possible damage thereto upon differential expansion of the materials when exposed to the intense furnace heat.

The cylindrical nozzle 34 has a rounded contour at its lower end 60 and is provided with a conventional pattern of angled outlet ports 62 extending between the nozzle bore 52 and the end wall to uniformly distribute the oxygen flow.

The present lance assembly in operation functions in the same manner as that of the prior art, a large volume of oxygen being pumped through the inner pipe 36, bore 52 and outlet ports 62 against the surface of the molten steel bath. At the same time, a flow of cooling water is maintained through the channels 46 and 48 to prevent destruction of the lance. The nozzle 34, being of a refractory material, is highly resistant to the intense heat, slag splashing and high velocity oxygen flow to which it is subjected. Should the nozzle become damaged, the integrity of the cooling water channels will not be affected and the lance may accordingly be withdrawn intact from the furnace. The damaged nozzle may then be broken off with a hammer, and a new nozzle quickly screwed in place to permit the lance to again be positioned above the steel bath for the application of oxygen to the steel.

The refractory material selected for the nozzle should have high strength, good thermal shock resistance, low porosity and permeability and resistance to basic slags. It should also high a high thermal conductivity to allow partial cooling from the oxygen flow and be suitable for fabrication in the desired shape. There are a number of materials which possess these properties in varying degrees, particularly the refractory metallic oxides including zirconia, magnesia, zircon, alumina, berylia, silica or a blend of these oxides, as well as silicon carbide and tungsten carbide. Other refractory materials may also possess the desired properties and the materials listed are only an example of those that could be satisfactorily employed.

Manifestly, changes in details of construction can be effected by those skilled in the art without departing from the spirit and the scope of the invention as defined in and limited solely by the appended claims.

We claim:

1. An oxygen lance assembly comprising an elongated metal lance, an oxygen passage extending coaxially through said lance, coolant channels within said lance, a nozzle of refractory material on the lower end of said lance, a bore in said nozzle communicating with said oxygen passage, outlet ports in said nozzle extending between said bore and the lower end of said nozzle, and means demountably connecting said nozzle to said lance, said nozzle being imperforate except for said bore and outlet ports and hence independent of all the lance coolant channels whereby the integrity of the coolant channels is preserved upon failure of the nozzle to prevent destruction of the lance.

2. An oxygen lance assembly comprising an elongated metal lance, said lance comprising inner, intermediate and outer concentrically spaced pipes, said inner pipe defining an oxygen passage, an annular bottom plate extending between the lower end of said outer pipe and said inner pipe, said intermediate pipe terminating in spaced relation above said bottom plate, said concentric pipes and annular bottom plate defining channels for a liquid coolant therebetween, a nozzle of refractory material threadedly secured on the lower end of said lance beneath said bottom plate, a bore in said nozzle communicating with said inner pipe, and outlet ports extending between said bore and the lower end of said nozzle, said nozzle being imperforate except for said bore and outlet ports, said annular bottom plate closing said nozzle from communication with all lance coolant channels whereby the integrity of the coolant channels is preserved upon failure of the nozzle to prevent destruction of the lance.

3. An oxygen lance assembly as claimed in claim 2 wherein the nozzle refractory material comprises a refractory metallic oxide.

4. An oxygen lance assembly as claimed in claim 3 wherein said refractory metallic oxide comprises zirconium oxide.

References Cited

UNITED STATES PATENTS

| | | | |
|---|---|---|---|
| 1,468,370 | 9/1923 | Morse | 239—132.3 |
| 1,999,121 | 4/1935 | Wilson | 239—600 X |
| 2,774,625 | 12/1956 | Hawley et al. | 239—132.3 X |
| 2,829,960 | 4/1958 | Vogt | 266—34 X |
| 3,045,997 | 7/1962 | Hudson | 266—34 |
| 3,236,281 | 2/1966 | Bain et al. | 239—132.3 X |
| 3,352,552 | 11/1967 | Koenig et al. | |

FOREIGN PATENTS

| | | |
|---|---|---|
| 919,402 | 2/1963 | Great Britain. |

EVERETT W. KIRBY, Primary Examiner

U.S. Cl. X.R.

266—34